United States Patent
Oono et al.

(10) Patent No.: US 9,722,250 B2
(45) Date of Patent: Aug. 1, 2017

(54) ELECTRODE MATERIAL AND METHOD FOR MANUFACTURING SAME

(71) Applicant: SUMITOMO OSAKA CEMENT CO., LTD., Tokyo (JP)

(72) Inventors: Kouji Oono, Chiba (JP); Kenta Ooishi, Funabashi (JP); Takao Kitagawa, Funabashi (JP); Masataka Oyama, Yachi (JP); Satoru Oshitari, Funabashi (JP); Ryuuta Yamaya, Narashino (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 14/697,123

(22) Filed: Apr. 27, 2015

(65) Prior Publication Data

US 2016/0190589 A1   Jun. 30, 2016

(30) Foreign Application Priority Data

Dec. 26, 2014 (JP) ................. 2014-265604

(51) Int. Cl.
  *H01M 4/62* (2006.01)
  *H01M 4/58* (2010.01)
  *H01M 4/04* (2006.01)
  *H01M 4/36* (2006.01)
  *C01B 25/45* (2006.01)

(52) U.S. Cl.
  CPC ............... *H01M 4/62* (2013.01); *C01B 25/45* (2013.01); *H01M 4/0471* (2013.01); *H01M 4/366* (2013.01); *H01M 4/5825* (2013.01); *H01M 4/625* (2013.01)

(58) Field of Classification Search
  CPC ...... H01M 4/0471; H01M 4/366; H01M 4/58; H01M 4/5825; H01M 4/62; H01M 4/625
  See application file for complete search history.

(56) References Cited

U.S. PATENT DOCUMENTS

2002/0127473 A1  9/2002 Ooya et al.
2015/0056507 A1* 2/2015 Dadheech ............. H01M 4/366
                                                 429/218.1

FOREIGN PATENT DOCUMENTS

| JP | 2001015111 A | 1/2001 |
|---|---|---|
| JP | 2003-109599 A | 4/2003 |
| JP | 2006-31987 A | 2/2006 |
| JP | 2008507832 A | 3/2008 |
| JP | 2010529593 A | 8/2010 |
| JP | 2013-69567 A | 4/2013 |
| JP | 2014-143032 A | 8/2014 |
| JP | 2014216241 A | 11/2014 |

OTHER PUBLICATIONS

JPO Office Action of JP Appln. No. 2014-265604 dated Mar. 24, 2015.

* cited by examiner

*Primary Examiner* — Carlos Barcena
(74) *Attorney, Agent, or Firm* — Greenblum & Bernstein, P.L.C.

(57) ABSTRACT

An electrode material including electrode active material particles and a carbonaceous film layer coating surfaces of the electrode active material particles and including a metal oxide, a content ratio of the metal oxide in the carbonaceous film layer being 5% by mass to 70% by mass. A method for manufacturing an electrode material, in which electrode active material particles, a metal salt or metal alkoxide containing any one or more metal atoms selected from a group consisting of Al, Zr, Si, and Ti, and an organic compound which is a precursor of carbon are mixed so that a total blending amount of the metal salt or metal alkoxide satisfies that an amount of a metal oxide in the carbonaceous film layer when the metal salt or metal alkoxide is all changed to the metal oxide is 5% by mass to 70% by mass, and are heated in a non-oxidative atmosphere.

5 Claims, 1 Drawing Sheet

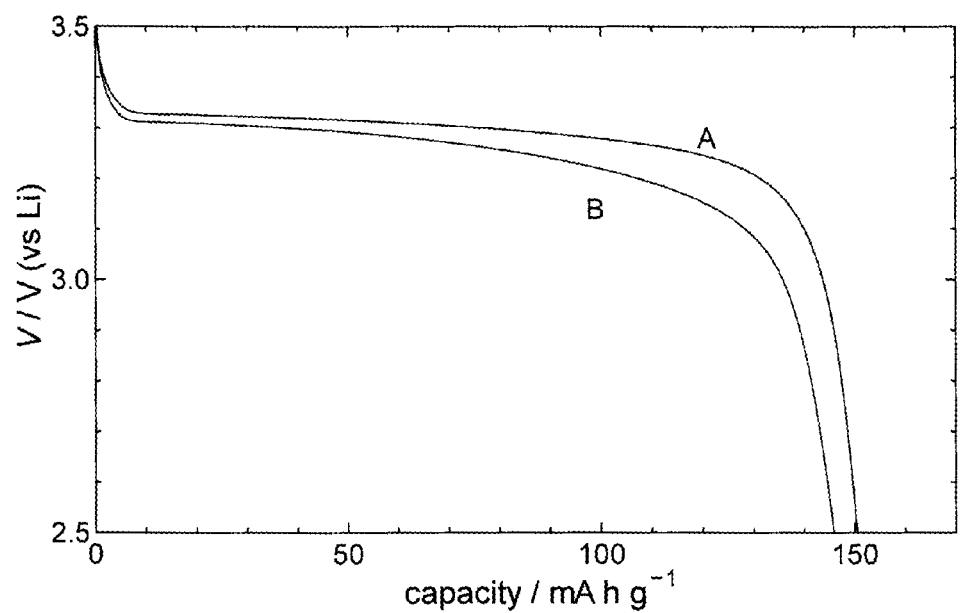

ELECTRODE MATERIAL AND METHOD FOR MANUFACTURING SAME

BACKGROUND OF THE INVENTION

Field of the Invention

The present invention relates to an electrode material and a method for manufacturing the same.

Description of Related Art

In recent years, as a battery anticipated to have a small size, a light weight, and high capacity, a non-aqueous electrolytic solution-based secondary battery such as a lithium ion battery has been proposed and put into practical use. The lithium ion battery is configured to have a positive electrode and a negative electrode which have properties capable of reversibly intercalating and deintercalating lithium ions, and a non-aqueous electrolyte.

Regarding a negative electrode material for the lithium ion battery, as a negative electrode active material, generally, a carbon-based material or a lithium-containing metal oxide having properties capable of reversibly intercalating and deintercalating lithium ions such as lithium titanate ($Li_4Ti_5O_{12}$) is used.

On the other hand, regarding a positive electrode material for the lithium ion battery, as a positive electrode active material, a lithium-containing metal oxide having properties capable of reversibly intercalating and deintercalating lithium ions such as lithium iron phosphate ($LiFePO_4$) or an electrode material mixture including a binder and the like is used. In addition, when the electrode material mixture is applied to the surface of a metal foil called a collector, the positive electrode in the lithium ion battery is formed.

Compared with secondary batteries of the related art such as lead batteries, nickel-cadmium batteries, and nickel-hydrogen batteries, the lithium ion batteries have a lighter weight, a smaller size, and higher energy. Therefore, the lithium ion batteries are used not only as small-size power supplies in portable electronic devices such as mobile phones and notebook personal computers but also as large-size stationary emergency power supplies.

In addition, recently, studies have been underway regarding the use of lithium ion batteries as high-output power supplies for plug-in hybrid vehicles, hybrid vehicles, and electric power tools. Batteries used as the high-output power supplies are required to have high-speed charge and discharge characteristics.

Among the electrode active materials, the lithium oxoacid salt-based compound (particularly, lithium iron phosphate) is attracting attention due to the excellent safety and the absence of problems with its resource and cost. However, the lithium oxoacid salt-based compound has a problem with low electron conductivity due to its crystal structure (olivine-type crystal structure).

Therefore, in order to increase the electron conductivity of an electrode material for which the lithium oxoacid salt-based compound is used as an electrode active material, means of JP-A-2001-15111 has been proposed. In JP-A-2001-15111, particle surfaces of an electrode active material made of lithium iron phosphate are covered with an organic compound that is a carbon source, then, the organic compound is carbonized so as to form a carbonaceous film on the surface of the electrode active material, and carbon in the carbonaceous film is made to act as an electron conductive substance.

In addition, JP-A-2014-216241 discloses that, in order to improve not only the electron conductivity but also the lithium ion conductivity, the electrode material is provided with a configuration in which a carbonaceous film containing an ion conductive substance is formed on the surfaces of electrode active material particles.

Furthermore, JP-T-2008-507832 discloses that, in order to restrict the growth of the fine crystals of a positive electrode active material, at least one precursor of the positive electrode active material and a specific additional compound (including an oxide such as $Al_2O_3$, $TiO_2$, $ZrO_2$, or $Fe_2O_3$) are thermally treated.

In JP-T-2010-529593, in order to increase the capacity of the lithium ion secondary battery, a positive electrode active material for a lithium ion battery is configured to include a sintered product formed by sintering lithium iron phosphate together with at least one metal oxide.

SUMMARY OF THE INVENTION

As described in JP-T-2010-529593, when lithium iron phosphate and a metal oxide are sintered and mixed crystals are formed, the electric conductivity improves and, furthermore, the formation of the carbonaceous film improves the electric conductivity.

However, the carbonaceous film acts as a hindrance to a redox reaction of lithium ions and also acts as a hindrance to the diffusion of lithium ions. Therefore, as the coating proportion by the carbonaceous film increases and as the film thickness of the carbonaceous film increases, the lithium ion conductivity is more impaired. Therefore, the improvement of the electron conductivity and the improvement of the lithium ion conductivity have a trade-off relationship with each other. As described in JP-A-2014-216241, when an ion conductive substance is included in the carbonaceous film, it is possible to maintain a certain level of ion conductivity, but higher ion conductivity is required.

As described in JP-T-2008-507832, when a metal compound and carbon are added to a precursor of an active material and are reacted together during the synthesis of a positive electrode active material, a uniform carbonaceous film is not formed on the surfaces of the positive electrode active material. Furthermore, JP-T-2008-507832 does not describe anything about the electron conductivity and the ion conductivity and JP-T-2010-529593 does not describe any means for improving the ion conductivity either.

An object of the present invention is to provide an electrode material which does not impair the improvement of the electron conductivity, has excellent wettability with an electrolytic solution, and has excellent ion conductivity and a method for manufacturing the electrode material having a carbonaceous film uniformly applied to electrode active material particles.

The present inventors and the like found that, when an organic compound which is a precursor of carbon and a metal salt or a metal alkoxide which is a precursor of a metal oxide are mixed and heated together so as to generate a carbonaceous film layer including a metal oxide, the wettability of an electrode material with an electrolytic solution is improved by the metal oxide and the contact area with the electrolytic solution can be increased. The present inventors and the like also found that an electrode material capable of suppressing the sintering and grain growth of an electrode active material can be obtained through heating in which an organic compound is carbonized, and completed the present invention.

That is, the present invention provides the following electrode materials and methods for manufacturing the same.

<1> An electrode material including electrode active material particles and a carbonaceous film layer which coats surfaces of the electrode active material particles and includes a metal oxide, in which a content ratio of the metal oxide in the carbonaceous film layer is in a range of 5% by mass to 70% by mass.

<2> A method for manufacturing an electrode material, in which electrode active material particles, a metal salt or metal alkoxide containing any one or more metal atoms selected from a group consisting of Al, Zr, Si, and Ti, and an organic compound which is a precursor of carbon are mixed so that a total blending amount of the metal salt or metal alkoxide satisfies that an amount of a metal oxide included in the carbonaceous film layer when the metal salt or metal alkoxide is all changed to the metal oxide falls in a range of 5% by mass to 70% by mass, and are heated in a non-oxidative atmosphere.

Hereinafter, in some cases, "the metal salt or metal alkoxide containing any one or more metal atoms selected from a group consisting of Al, Zr, Si, and Ti" will be referred to as the metal oxide precursor.

According to the present invention, it is possible to provide an electrode material which does not impair the improvement of the electron conductivity, has excellent wettability with an electrolytic solution, and has excellent ion conductivity and a method for manufacturing the electrode material having a carbonaceous film uniformly applied to electrode active material particles.

BRIEF DESCRIPTION OF THE DRAWING

The FIGURE illustrates discharge curves of lithium ion batteries obtained in Example 3 and Comparative Example 1.

DETAILED DESCRIPTION OF THE INVENTION

Electrode Material

An electrode material of the present invention includes electrode active material particles and a carbonaceous film layer which coats the surfaces of the electrode active material particles and includes a metal oxide, in which the content ratio of the metal oxide in the carbonaceous film layer is in a range of 5% by mass to 70% by mass.

When having the above-described configuration, the electrode material has excellent wettability with an electrolytic solution and has excellent ion conductivity without impairing the electron conductivity.

The reasons are not clear, but the electrode material is assumed to have the above-described properties for the following reasons.

Regarding the electrode active material particles having the carbonaceous film layer, in the manufacturing process, carbon-coated layers are likely to fuse and agglomerate together and, when the agglomerate disengages, surfaces not coated with the carbonaceous film are exposed. Therefore, highly lithium ion conductive surfaces and poorly lithium ion conductive surfaces coexist on the surfaces of the electrode active material particles, and surfaces with insufficient electron conduction are likely to be generated. In addition, the wettability of the carbonaceous film with an electrolytic solution is not sufficient and, particularly, in a high-density electrode, it is not possible to sufficiently ensure the wettability with an electrolytic solution, the reaction area of the electrode material is likely to decrease. Therefore, the output characteristics of the electrode material become uneven.

On the contrary, the electrode material of the present invention includes the carbonaceous film layer including the above-described amount of the metal oxide on the surfaces of the electrode active material particles. In the film layer of the present invention, it is considered that regions of the metal oxide which form a discontinuous phase are dotted in a region of carbon which forms a continuous phase in the film layer, the presence of the metal oxide suppresses the excessive generation of agglomerate and helps spaces among the carbonaceous film-coated electrode active material particles filled with an electrolytic solution. Therefore, it is considered that the carbonaceous film-coated electrode active material particles and the electrolytic solution easily come into contact with each other and thus the reaction area between the carbonaceous film-coated electrode active material particles and the electrolytic solution increases, the wettability with the electrolytic solution is excellent, and the ion conductivity improves.

Furthermore, since at least a part of the metal oxide in the continuous phase of carbon region diffuses into the electrode active material particles, it is considered that the carbonaceous film layer becomes porous and the ion conductivity further improves.

As described above, when the electrode material of the present invention having excellent wettability with an electrolytic solution and excellent ion conductivity is used for an electrode, the intercalation and deintercalation of lithium ions become easy and the area in which lithium ions are intercalated and deintercalated is likely to increase since the electrode material has excellent wettability with an electrolytic solution. As a result, a lithium ion battery in which the electrode material of the present invention is used for an electrode and the electrode is used for a positive electrode has excellent output characteristics.

Hereinafter, individual elements configuring the electrode material and the aspects of the electrode material will be described in detail.

Electrode Active Material Particles

The electrode material of the present invention includes electrode active material particles.

Examples of an electrode active material configuring the electrode active material particles include lithium cobaltate, lithium nickelate, lithium manganate, lithium titanate, and $Li_xA_yD_zPO_4$ (here, A represents one or more selected from the group consisting of Co, Mn, Ni, Fe, Cu, and Cr, D represents one or more selected from the group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$; preferably, A represents one or more selected from the group consisting of Co, Mn, Ni, Fe, Cu, and Cr, D represents one or more selected from the group consisting of Mg, Ca, Sr, Ba, Ti, Zn, B, Al, Ga, In, Si, Ge, Sc, Y, and rare earth elements, $0<x<1.2$, $0<y<1$, $0 \leq z<1.5$, and $0.9<y+z \leq 1$).

The electrode active material particles preferably include at least one selected from the group consisting of lithium cobaltate, lithium nickelate, lithium manganate, lithium titanate, and $Li_xA_yD_zPO_4$ as a main component.

Here, the main component refers to a component having a content in the total mass of the electrode active material particles of more than 50% by mass.

A is preferably Co, Mn, Ni, or Fe since it is easy to obtain a high discharge potential. D is preferably Mg, Ca, Sr, Ba, Ti, Zn, or Al since it is easy to obtain a high discharge potential.

In addition, the rare earth elements refer to 15 elements of La, Ce, Pr, Nd, Pm, Sm, Eu, Gd, Tb, Dy, Ho, Er, Tm, Yb, and Lu which belong to the lanthanum series.

Among them, the electrode active material is preferably $Li_xFe_yD_zPO_4$ (A is Fe), more preferably $Li_xFe_yPO_4$ (A is Fe, and z is 0), and still more preferably $LiFePO_4$.

As the compound represented by $Li_xA_yD_zPO_4$, it is possible to use a compound manufactured using a method of the related art such as a solid phase method, a liquid phase method, or a gas phase method. As $Li_xA_yD_zPO_4$, for example, a granular compound (in some cases, referred to as $Li_xA_yD_zPO_4$ particles) can be used.

$Li_xA_yD_zPO_4$ can be obtained by, for example, hydrothermally synthesizing a slurry-form mixture obtained by mixing a Li source, an A source, a P source, water, and, if necessary, a D source, washing the obtained sediment using water so as to generate a precursor substance of the electrode active material, and furthermore firing the precursor substance. During the hydrothermal synthesis, a pressure resistant airtight container is preferably used.

Here, examples of the Li source include lithium salts such as lithium acetate ($LiCH_3COO$) and lithium chloride (LiCl), lithium hydroxide (LiOH), and the like, and it is preferable to use at least one selected from the group consisting of lithium acetate, lithium chloride, and lithium hydroxide.

Examples of the A source include chlorides, carboxylate salts, hydrosulfate, and the like which include at least one selected from the group consisting of Co, Mn, Ni, Fe, Cu, and Cr. For example, in a case in which A is Fe, examples of a Fe source include divalent iron salts such as iron (II) chloride ($FeCl_2$), iron (II) acetate ($Fe(CH_3COO)_2$), and iron (II) sulfate ($FeSO_4$), and it is preferable to use at least one selected from the group consisting of iron (II) chloride, iron (II) acetate, and iron (II) sulfate.

Examples of the D source include chlorides, carboxylate salts, hydrosulfate, and the like which include at least one selected from the group consisting of Mg, Ca, S, Sr, Ba, Ti, Zn, B, Al, Ga, In, Si, Ge, Sc, Y, and rare earth elements.

Examples of the P source include phosphoric acid compounds such as phosphoric acid ($H_3PO_4$), ammonium dihydrogen phosphate ($NH_4H_2PO_4$), and diammonium hydrogen phosphate ($(NH_4)_2HPO_4$), and it is preferable to use at least one selected from the group consisting of phosphoric acid, ammonium dihydrogen phosphate, and diammonium hydrogen phosphate.

The $Li_xA_yD_zPO_4$ particles may be crystalline particles, amorphous particles, or mixed crystal particles in which crystalline particles and amorphous particles coexist. The $Li_xA_yD_zPO_4$ particles may be amorphous particles since, when thermally treated in a non-oxidative atmosphere at a temperature in a range of 500° C. to 1000° C., the amorphous $Li_xA_yD_zPO_4$ particles crystallizes.

The size of the electrode active material particle is not particularly limited, and the average particle diameter of the primary particles is preferably in a range of 10 nm to 20,000 nm, and more preferably in a range of 20 nm to 5,000 nm.

In the present invention, the average particle diameter refers to the particle diameter D50 at which the cumulative volume percentage reaches 50% in the particle size distribution.

When the average particle diameter of the primary particles of the electrode active material particles is 10 nm or more, it is possible to sufficiently coat the surfaces of the primary particles with the carbonaceous film, a decrease in the discharge capacity at a high charge-discharge rate is suppressed, and it is possible to realize sufficient charge and discharge rate performance. In addition, when the average particle diameter of the primary particles of the electrode active material particles is 20,000 nm or less, the internal resistance of the primary particles does not easily become high, and the discharge capacity at a high charge-discharge rate is not easily impaired.

The average particle diameter of the primary particles of the electrode active material particles can be measured by measuring a dispersion element using an LB-550 manufactured by Horiba Ltd. or by observing the primary particles using an electronic microscope and counting the diameters.

The shape of the electrode active material particle is not particularly limited, but is preferably spherical, particularly truly spherical. When the electrode active material particles are spherical, it is possible to reduce the amount of the solvent when paste for positive electrodes is prepared using the electrode material of the present invention and it becomes easy to apply the paste for positive electrodes to a collector. The paste for positive electrodes can be prepared by, for example, mixing the electrode material of the present invention, a binder resin (binding agent), and a solvent together.

In addition, when the shapes of the electrode active material particles are spherical, the surface area of the electrode active material particles is minimized, it is possible to set the blending amount of the binder resin (binding agent) added to the electrode material to the minimum amount, and it is possible to decrease the internal resistance of the obtained positive electrode, which is preferable.

Furthermore, when the shapes of the electrode active material particles are spherical, it is easy to closely pack the electrode active material, thus, the amount of a positive electrode material loaded per unit volume increases and thus it is possible to increase the electrode density. As a result, it is possible to increase the capacity of the lithium ion battery, which is preferable.

Carbonaceous Film Layer

The electrode material of the present invention includes the carbonaceous film layer which coats the surfaces of the electrode active material particles and includes a metal oxide.

The film layer preferably coats at least a part or all of the surfaces of the electrode active material particles.

Metal Oxide

The metal oxide configuring the film layer is not particularly limited and examples thereof include $Al_2O_3$, $ZrO_2$, $SiO_2$, $TiO_2$, and the like. The metal oxide is preferably a substance having no adverse influence on the lithium ion conductivity of the electrode active material particles and, in order to suppress the sintering or grain growth of the electrode active material particles, the metal oxide is preferably a substance having different properties from the electrode active material particles. From such a viewpoint, the metal oxide is preferably at least one selected from the group consisting of $Al_2O_3$, $ZrO_2$, $SiO_2$, $TiO_2$, and the like.

The metal oxide may be configured of one metal oxide or may be configured of two or more oxides.

The metal oxide is preferably uniformly disposed in the carbonaceous film layer so that the wettability of the electrode material with an electrolytic solution can be sufficiently ensured.

The improvement of the wettability and the improvement of the ion conductivity are admitted with the addition of an extremely small amount of the metal oxide to the carbonaceous film layer of the present invention.

The content of the metal oxide in the carbonaceous film layer is in a range of 5% by mass to 70% by mass. When the amount of the metal oxide is 5% by mass or more, it is possible to improve the wettability with an electrolytic solution and improve the lithium ion conductivity. When the amount of the metal oxide is 70% by mass or less, the electron conductivity is not easily impaired.

From the same viewpoint, the content ratio of the metal oxide in the carbonaceous film layer is preferably in a range of 10% by mass to 30% by mass.

The metal oxide included in the carbonaceous film layer may have a particle shape or an irregular shape and the carbonaceous film layer including the metal oxide preferably uniformly coats the surfaces of the electrode active material particles.

In order to uniformly coat the electrode active material particles with the carbonaceous film layer, in a case in which the metal oxide has a particle form, the average particle diameter of the metal oxide included in the carbonaceous film layer is 2 nm or less and preferably 1 nm or less.

Carbon

Carbon configuring the carbonaceous film layer is obtained by carbonizing an organic compound that serves as a raw material of carbon. The organic compound that serves as a raw material of carbon will be described below in detail.

In the present invention, since the carbonaceous film layer that coats the surfaces of the electrode active material particles includes the metal oxide, the wettability of the electrode material with an electrolytic solution is improved, and the sintering and grain growth of the electrode active material are suppressed, the carbonaceous film layer including the metal oxide is preferably uniformly disposed on the surfaces of the electrode active material particles.

In the electrode material of the present invention, since the surfaces of the electrode active material particles are coated with the carbonaceous film layer including the metal oxide, the electrode active material particles are not easily agglomerated and, when the agglomerate of the electrode material disengages, the exposure of surfaces not coated with the carbonaceous film is suppressed.

In addition, since the metal oxide is included, when the electrode material is brought into contact with an electrolytic solution, the electrolytic solution more easily travels to the surfaces of the electrode active material particles and the wettability of the electrode material with an electrolytic solution can be further improved.

The electrode material of the present invention can be manufactured using an arbitrary method with which the above-described configuration can be obtained; however, from the viewpoint of the above-described preferable aspects, the electrode material is preferably manufactured using a method for manufacturing an electrode material of the present invention described below.

Method for Manufacturing Electrode Material

The method for manufacturing an electrode material of the present invention is a method in which electrode active material particles, a metal salt or metal alkoxide containing any one or more metal atoms selected from a group consisting of Al, Zr, Si, and Ti, and an organic compound which is a precursor of carbon are mixed so that a total blending amount of the metal salt or metal alkoxide satisfies that an amount of a metal oxide included in the carbonaceous film layer when the metal salt or metal alkoxide is all changed to the metal oxide falls in a range of 5% by mass to 70% by mass, and are heated in a non-oxidative atmosphere, thereby manufacturing the electrode material of the present invention.

"The metal salt or metal alkoxide containing any one or more metal atoms selected from a group consisting of Al, Zr, Si, and Ti" is a compound from which the metal oxide is obtained when heated in a non-oxidative atmosphere together with the electrode active material particles and the organic compound and is a so-called metal oxide precursor.

In the manufacturing of the electrode material, the electrode active material particles, the metal oxide precursor, and the organic compound are preferably mixed together by further mixing in water and preparing a slurry (hereinafter, in some cases, referred to as "the slurry preparation step") so that carbon in the film layer and the metal oxide are uniformly disposed on the surfaces of the electrode active material particles.

For the heating of a mixture including at least the electrode active material particles, the metal oxide precursor, and the organic compound in a non-oxidative atmosphere, the mixture is preferably fired at a temperature in a range of 500° C. to 1000° C. in a non-oxidative atmosphere (hereinafter, in some cases, referred to "the firing step").

The firing step is more preferably a step in which the slurry obtained in the slurry preparation step is dried and the obtained dried substance is fired at a temperature in a range of 500° C. to 1000° C. in a non-oxidative atmosphere.

Since the method for manufacturing an electrode material of the present invention includes the slurry preparation step, it is easy to uniformly mix the electrode active material particles, the metal oxide precursor, and the organic compound and uniformly dispose carbon and the metal oxide on the surfaces of the electrode active material particles.

In the present invention, instead of mixing the metal oxide and the organic compound which is a precursor of carbon and heating the mixture on the surfaces of the electrode active material particles, the metal oxide precursor is mixed with the electrode active material particles and the organic compound and the mixture is heated, thereby obtaining the metal oxide as a component of the film layer. Therefore, the metal oxide included in the film layer is easily uniformly disposed in carbon which serves as a continuous phase.

The slurry preparation step enables the surfaces of the electrode active material particles to be uniformly coated with the organic compound and the oxide precursor. Furthermore, through the firing step, the organic compound that coats the surfaces of the electrode active material particles is carbonized, the metal oxide precursor changes to the metal oxide, and the electrode material including the electrode active material particles including the film layer in which the electrode active material particles are uniformly coated with carbon and the metal oxide can be obtained.

Raw Material of Electrode Active Material Particles

Examples of the electrode active material used in the method for manufacturing an electrode material of the present invention include substances described as the electrode active material configuring the electrode active material particles including the electrode material of the present invention and preferable aspects are also identical. Examples of the precursor of the electrode active material also include the precursors listed in the description of the electrode material.

Metal Oxide Precursor

The metal oxide precursor used in the method for manufacturing an electrode material of the present invention is a metal salt or metal alkoxide containing any one or more metal atoms selected from the group consisting of Al, Zr, Si, and Ti and the precursor may have a colloid particle form.

Examples of the metal salt include metal salts of inorganic acid, metal salts of fatty acid, and the like.

Examples of the metal salts of inorganic acid include metal salts of carbonic acid, metal salts of chloric acid, metal salts of nitric acid, metal salts of sulfuric acid, and the like and specific examples thereof include zirconium sulfate, ammonium zirconium oxycarbonate, zirconium nitrate oxide, and the like.

Examples of the metal salts of fatty acid include acetates, propionates, butyrates, and the like of Al, Zr, Si, and Ti. The number of carbon atoms in the fatty acid is preferably in a range of 1 to 5, more preferably in a range of 1 to 3, and still more preferably 1 or 2. The fatty acid may be a monovalent or multivalent fatty acid, but the fatty acid is preferably a monovalent fatty acid. Specific examples thereof include zirconium oxyacetate, aluminum acetate (aluminum tris acetate), titanium acetate, and the like.

The metal alkoxide is preferably a monovalent or multivalent alcohol-derived compound having a straight or branched alkyl group having 1 to 5 carbon atoms and more preferably a monovalent alcohol-derived compound having an alkyl group having 1 to 3 carbon atoms. Specific examples thereof include aluminum ethoxide, zirconium ethoxide, silicon ethoxide, titanium ethoxide, aluminum isopropoxide, titanium tetraisopropoxide, and the like.

Among them, the metal salts of carbonic acid and the metal salts of fatty acid which include any one or more metal atoms selected from the group consisting of Al, Zr, Si, and Ti, and the monovalent alcohol-derived metal alkoxide having an alkyl group having 1 to 3 carbon atoms are preferred, metal salts of acetic acid including one or more metal atoms selected from the group consisting of Al, Zr, Si, and Ti are more preferred, and zirconium acetate is still more preferred.

Organic Compound

The organic compound used in the method for manufacturing an electrode material of the present invention is not particularly limited as long as the compound is capable of forming carbon which is a component of the film layer that coats the surfaces of the electrode active material particles and examples thereof include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, divalent alcohols, trivalent alcohols, and the like.

The blending ratio between the raw material of the electrode active material particles and the organic compound is preferably in a range of 0.6 parts by mass to 4.0 parts by mass and more preferably in a range of 1.1 parts by mass to 1.7 parts by mass with respect to 100 parts by mass of the raw material of the electrode active material particles when the total amount of the organic compound is converted to the amount of carbon.

When the blending ratio of the organic compound in terms of the amount of carbon is 0.6 parts by mass or more, in a case in which a battery is formed, the discharge capacity does not easily decrease at a high charge-discharge rate and it is possible to realize sufficient charge and discharge rate performance. When the blending ratio of the organic compound in terms of the amount of carbon is 4.0 parts by mass or less, steric hindrance to the diffusion of lithium ions in the carbon region in the film layer is small and the lithium ion migration resistance decreases. As a result, in a case in which a battery is formed, the internal resistance of the battery does not easily increase and it is possible to suppress voltage drop at a high charge-discharge rate.

The blending amount of the metal oxide precursor varies with the type of the metal oxide precursor but the metal oxide precursor is blended so that the total blending amount of the metal oxide precursor satisfies that the amount of the metal oxide included in the carbonaceous film layer when the metal oxide precursor is all changed to the metal oxide (hereinafter, referred to as "the metal oxide-equivalent content ratio") falls in a range of 5% by mass to 70% by mass. When the metal oxide-equivalent content ratio is set to 10% by mass or more, it is possible to improve the wettability with an electrolytic solution and improve the lithium ion conductivity and, when the metal oxide-equivalent content ratio is set to 70% by mass or less, the electron conductivity is not easily impaired.

From the same viewpoint, the metal oxide-equivalent content ratio is preferably in a range of 10% by mass to 30% by mass.

In the method for manufacturing an electrode material of the present invention, it is preferable to prepare a homogeneous slurry by dissolving or dispersing the raw material of the electrode active material particles, the metal oxide precursor, and the organic compound in water. When the respective components are dissolved or dispersed in water, it is also possible to add a dispersant. Regarding the method for dissolving or dispersing the raw material of the electrode active material particles, the metal oxide precursor, and the organic compound in water, there is no particular limitation as long as the raw material of the electrode active material particles is dispersed and the metal oxide precursor and the organic compound are dissolved or dispersed and, for example, it is preferable to use a disperser such as a planetary ball mill, a vibration ball mill, a bead mill, a paint shaker, or an attritor.

During the dissolution or dispersion of the raw material of the electrode active material particles, the metal oxide precursor, and the organic compound in water, it is preferable to disperse the raw material of the electrode active material particles in a primary particle form, then, add the metal oxide precursor and the organic compound, and stir the components so as to be dissolved. Therefore, the metal oxide precursor and the organic compound are uniformly disposed on the surfaces of the primary particles of the electrode active material and the surfaces of the electrode active material particles are coated with the film layer made up of a metal oxide derived from the metal oxide precursor and carbon derived from the organic compound. Since the metal oxide and the carbon in the film layer are heated in a state in which the metal oxide precursor and the organic compound are uniformly disposed on the surfaces of the primary particles of the electrode active material and change to a metal oxide and carbon, the carbonaceous film layer in which the metal oxide and carbon are uniformly disposed on the surfaces of the electrode active material particles is formed.

In the preparation of the slurry including the electrode active material particles, the metal oxide precursor, the organic compound, and water, the dispersion conditions of the slurry, for example, the concentrations of the raw material of the electrode active material particles, the metal oxide precursor, and the organic compound in the slurry, the stirring time, and the like are appropriately adjusted so that the ratio (D90/D10) of the raw material of the electrode active material particles falls in a range of 5 to 30. Therefore, it is possible to set the volume density of the obtained agglomerate in a range of 50% by volume to 80% by volume of the volume density of the solid agglomerate.

Next, the slurry is heated in a non-oxidative atmosphere.

Preferably, the slurry is sprayed and dried in a high-temperature atmosphere, for example, in the atmosphere at a temperature in a range of 70° C. to 250° C. and, subsequently, the dried substance is fired in a non-oxidative atmosphere at a temperature in a range of 500° C. to 1,000° C., more preferably in a range of 600° C. to 900° C., for 0.1 hours to 40 hours.

The non-oxidative atmosphere is preferably an inert atmosphere of nitrogen ($N_2$), argon (Ar), or the like and, in a case in which it is necessary to further suppress oxidization, a reducing atmosphere including approximately several % by volume of a reducing gas such as hydrogen ($H_2$) is preferred. In addition, in order to remove organic components evaporated into the non-oxidative atmosphere during the firing, a combustion-enhancing or burnable gas such as oxygen ($O_2$) may be introduced into the inert atmosphere.

When the firing temperature is set to 500° C. or higher, it is easy for the organic compound included in the dried substance to be sufficiently decomposed and reacted and it is easy to sufficiently carbonize the organic compound. As a result, it is easy to prevent the generation of a high-resistance decomposed substance of the organic compound in the obtained agglomerate. When the firing temperature is set to 1000° C. or lower, Li in the electrode active material does not easily evaporate and the grain growth of the electrode active material is suppressed. As a result, it is possible to prevent the discharge capacity at a high charge-discharge rate from becoming low and it is possible to realize sufficient charge and discharge rate performance.

In the firing step, the particle size distribution of the obtained agglomerate can be controlled by appropriately adjusting conditions for firing the dried substance, for example, the rate of temperature increase, the peak holding temperature, the holding time, and the like.

Therefore, the surfaces of the primary particles of the electrode active material are coated with the film layer made up of carbon and the metal oxide which are generated by the thermal decomposition of the organic compound and the metal oxide precursor in the dried substance.

Electrode

An electrode of the present invention includes the electrode material of the present invention.

In order to produce the electrode of the present embodiment, paint for forming the electrode or paste for forming the electrode is prepared by mixing the above-described electrode material, a binding agent made of a binder resin, and a solvent. At this time, a conductive auxiliary agent such as carbon black may be added as necessary.

As the binding agent, that is, the binder resin, for example, a polytetrafluoroethylene (PTFE) resin, a polyvinylidene fluoride (PVdF) resin, fluororubber, or the like is preferably used.

The blending ratio between the electrode material and the binder resin is not particularly limited and, for example, the amount of the binder resin is set in a range of 1 part by mass to 30 parts by mass and preferably in a range of 3 parts by mass to 20 parts by mass with respect to 100 parts by mass of the electrode material.

The solvent used for paint for forming the electrode or paste for forming the electrode may be appropriately selected in accordance with the properties of the binder resin.

Examples thereof include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIRK), acetylacetone, and cyclohexanone; amides such as dimethyl formamide, N,N-dimethyl acetoacetamide, and N-methyl pyrrolidone; glycols such as ethylene glycol, diethylene glycol, and propylene glycol; and the like. These solvents may be singly used, or a mixture of two or more solvents may be used.

Next, the paint for forming the electrode or the paste for forming the electrode is applied to one surface of a metal foil, and then is dried, thereby obtaining a metal foil having a coat made of a mixture of the electrode material and the binder resin formed on one surface.

Next, the coat is bonded through pressurization and is dried, thereby producing a collector (electrode) having an electrode material layer on one surface of the metal foil.

In the above-described manner, it is possible to produce an electrode having excellent output characteristics.

Lithium Ion Battery

A lithium ion battery of the present invention includes a positive electrode made of the electrode of the present invention.

In the lithium ion battery, when the electrode is produced using the electrode material of the present invention, it is possible to decrease the internal resistance of the electrode. Therefore, it is possible to suppress the internal resistance of the battery at a low level, consequently, there is no concern of significant voltage drop, and it is possible to provide a lithium ion battery capable of high-speed charge and discharge.

In the lithium ion battery of the present invention, there is no particular limitation regarding the negative electrode, the electrolytic solution, the separator, and the like. For example, for the negative electrode, it is possible to use a negative electrode material such as Li metal, a carbon material, a Li alloy, or $Li_4Ti_5O_{12}$. In addition, a solid electrolyte may be used in place of the electrolytic solution and the separator.

According to the lithium ion battery of the present invention, since the positive electrode made of the electrode of the present invention is included, the output characteristics are excellent.

EXAMPLES

Next, the present invention will be specifically described using Examples 1 to 5 and Comparative Examples 1 and 2, but the present invention is not limited by these examples.

Example 1

Production of Electrode Material

After 4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture.

Next, the mixture was accommodated in a pressure resistant airtight vessel having a capacity of 8 L and was hydrothermally synthesized at 200° C. for 1 hour.

Subsequently, the obtained sediment was washed with water, thereby obtaining a cake-form precursor of an electrode active material.

Next, 150 g of a precursor of the electrode active material (in terms of the solid content), 0.83 g of zirconium oxyacetate as the metal oxide precursor, and a polyvinyl alcohol aqueous solution obtained by dissolving 5.4 g of polyvinyl alcohol (PVA) as the organic compound in 100 g of water were mixed together so as to produce a slurry, and a dispersion treatment was carried out on the slurry using a binary fluid-type wet jet crusher so that D50 reached 100 nm in the particle size distribution of precursor particles of the electrode active material in the slurry.

Next, the dispersion-treated slurry was sprayed in the atmosphere at 180° C. and was dried, thereby obtaining a dried substance having an average particle diameter of 6 μm.

Next, the obtained dried substance was fired at 700° C. in a nitrogen atmosphere for 1 hour, thereby obtaining an electrode material 1 of Example 1 having an average particle diameter of 6 μm.

Example 2

An electrode material 2 of Example 2 was produced in the same manner as in Example 1 except for the fact that, in Example 1, 0.83 g of zirconium oxyacetate was changed to 2.45 g of zirconium oxyacetate.

Example 3

An electrode material 3 of Example 3 was produced in the same manner as in Example 1 except for the fact that, in Example 1, 0.83 g of zirconium oxyacetate was changed to 0.34 g of ammonium zirconium oxycarbonate.

Production of Electrode

The obtained electrode material 3, polyvinylidene fluoride (PVdF) as a binder, and acetylene black (AB) as a conductive auxiliary agent were mixed so that the mass ratio reached 90:5:5 (electrode material 3:PVdF:AB) and, furthermore, N-methyl-2-pyrrolidinone (NMP) was added as a solvent so as to impart fluidity, thereby producing a slurry.

Next, the slurry was applied onto a 15 μm-thick aluminum (Al) foil and was dried. After that, the dried electrode material on Al foil was pressurized at a pressure of 600 kgf/cm², thereby producing a positive electrode 1 of a lithium ion battery of Example 3.

Production of Lithium Ion Battery

Lithium metal was disposed as a negative electrode against the positive electrode 1 of the lithium ion battery and a separator made of porous polypropylene was disposed between the positive electrode 1 and the negative electrode, thereby producing a battery member 1.

Meanwhile, ethylene carbonate and diethyl carbonate were mixed together at (a volume ratio of) 1:1 and, furthermore, $LiPF_6$ was added so as to adjust the concentration to 1 M, thereby producing an electrolyte solution 1 having lithium ion conductivity.

Next, the battery member 1 was disposed in a 2016 coin cell, the electrolyte solution 1 was added, and then the coil cell was sealed, thereby producing a lithium ion battery 1 of Example 3.

Example 4

An electrode material 4 of Example 4 was produced in the same manner as in Example 1 except for the fact that, in Example 1, 0.83 g of zirconium oxyacetate was changed to 0.6 g of aluminum acetate.

Example 5

An electrode material 5 of Example 5 was produced in the same manner as in Example 1 except for the fact that, in Example 1, 0.83 g of zirconium oxyacetate was changed to 0.53 g of titanium tetraisopropoxide to which an equivalent amount (substance amount ratio of 1:1) of acetylacetone was added as a stabilizer.

Comparative Example 1

An electrode material 101 of Comparative Example 1 was produced in the same manner as in Example 1 except for the fact that, in Example 1, 0.83 g of zirconium oxyacetate was not used.

The electrode 101 and a lithium ion battery 101 of Comparative Example 1 were produced in the same manner except for the fact that, in the production of the electrode 1 and the lithium ion battery of Example 3, the electrode material 101 was used in place of the electrode material 3.

Comparative Example 2

An electrode material 102 of Comparative Example 2 was produced in the same manner as in Example 1 except for the fact that, in Example 1, 0.83 g of zirconium oxyacetate was changed to 2.81 g of zirconium oxyacetate.

Assessment Method

The electrode materials, the electrodes, and the lithium ion batteries produced as described above were assessed using assessment methods described below. The performance of the electrodes can be evaluated using the assessments of the lithium ion batteries.

Assessment of Electrode Materials

For the respective components included in the electrode materials and the electrode materials, the properties and performance were assessed and the results of individual assessments (1) to (6) were described in Table 1. The assessment methods are as described below.

(1) Average Particle Diameter of Electrode Active Material Particles

The average particle diameter (D50) of the electrode active material particles was measured using an LB-550 manufactured by Horiba Ltd.

(2) Layer Thickness d of Carbonaceous Film Layer

The layer thickness of the carbonaceous film layer was measured using a transmission electron microscope.

(3) Amount of Carbon in Electrode Material

The amount of carbon [parts by mass] with respect to 100 parts by mass of the electrode active material particles was measured using a carbon analyzer [manufactured by Horiba Ltd., carbon and sulfur analyzer EMIA-810W].

(4) Amount of Metal Oxide in Carbonaceous Film Layer

The amount of the metal oxide when the metal oxide precursor blended during the manufacturing of the electrode material was all changed to the metal oxide was obtained from the amount of the metal oxide precursor blended and was computed as the amount of the metal oxide in the carbonaceous film layer.

(5) Assessment of Wettability of Electrolytic Solution in Electrode Material

The wettability of the electrolytic solution in the electrode material was assessed by measuring the relaxation time of pulse NMR using diethyl carbonate as a solvent. In a particle dispersion liquid having the same total surface area, as more particles are wetted by a solvent, the energy of hydrogen atoms in the excited solvent molecules more rapidly dissipates toward the particles and thus the relaxation time becomes short. That is, the total surface area in the dispersion liquid is obtained from the specific surface area and solid content concentration of the particles and the contribution to the relaxation time per unit area, that is, the affinity can be obtained. In Table 1, the values of the affinity were obtained from the respective relaxation times measured in Examples 1 to 4 and Comparative Example 1 using the following equation.

Affinity=[{$(t^{-1})-(t_0^{-1})$}/$t_0^{-1}$]/SSA t: the relaxation time of the sample
$t_0$: the relaxation time of the blank
SSA: the specific surface area of the sample That is, the slope obtained when the value obtained by dividing the difference of the inverse of the relaxation time by the inverse of the relaxation time of the blank and the specific surface area were plotted along the vertical and horizontal axes can be obtained as the value of the affinity to the electrolytic solution. The maximum value (Example 2) of the obtained numerical values was indicated as a relative value of 100. That is, a sample exhibiting the maximum affinity is indicated as a relative value of 100 and the lower relative value indicates smaller wettability to the electrolytic solution.

(6) Energy Density

A charge and discharge test was carried out using the produced batteries. The batteries were constant-current-discharged at 3 C and the energy densities per unit weight were obtained.

A battery in which the electron conductivity is not deteriorated, the wettability of an electrode material to an electrolytic solution is excellent (the relative value is 96 or more), and in a case in which the ion conductivity of the electrode material is high, the energy density is high (469 mwh/g or more) can be obtained. The high energy density of the electrode material as described above is assumed to be because the carbonaceous film uniformly coats the electrode active material particles and the oxide is uniformly distributed in the carbonaceous film.

The present invention can be used for positive electrode materials for batteries, furthermore, electrode materials used as positive electrode materials for lithium ion batteries, electrodes including the electrode material, and lithium ion batteries including a positive electrode made of the electrode.

What is claimed is:

1. An electrode material comprising:
electrode active material particles; and a carbonaceous film layer which coats surfaces of the electrode active material particles and includes a metal oxide,
wherein a content ratio of the metal oxide in the carbonaceous film layer is in a range of 5% by mass to 70% by mass,

TABLE 1

| | Electrode active material particles | | Film layer | | | | Electrode material | |
|---|---|---|---|---|---|---|---|---|
| | | | Carbon | | Metal oxide | | Electrolytic solution wettability Relative value | Energy density mWh/g |
| | Type | Average particle diameter nm | Layer thickness d nm | Amount of carbon to electrode active material particles Parts by mass | Type | Precursor Type | Amount of metal oxide in carbonaceous film layer % by mass | | |
| Example 1 | LiFePO$_4$ | 100 | 2 | 1.1 | ZrO$_2$ | Zirconium oxyacetate | 21 | 96 | 478 |
| Example 2 | LiFePO$_4$ | 100 | 2 | 1.2 | ZrO$_2$ | Zirconium oxyacetate | 62 | 100 | 469 |
| Example 3 | LiFePO$_4$ | 100 | 2 | 1.0 | ZrO$_2$ | Ammonium zirconium oxycarbonate | 23 | 97 | 480 |
| Example 4 | LiFePO$_4$ | 100 | 2 | 1.0 | Al$_2$O$_3$ | Aluminum acetate | 23 | 98 | 475 |
| Example 5 | LiFePO$_4$ | 100 | 2 | 0.9 | TiO$_2$ | Titanium tetraisopropoxide | 25 | 96 | 474 |
| Comparative Example 1 | LiFePO$_4$ | 100 | 2 | 1.0 | — | — | 0 | 87 | 465 |
| Comparative Example 2 | LiFePO$_4$ | 100 | 2 | 1.0 | ZrO$_2$ | Zirconium oxyacetate | 71 | 97 | 460 |

(7) Assessment of Ion Conductivity

The ion conductivities of the electrode materials were assessed using the discharge curves of the lithium ion batteries manufactured in Example 3 and Comparative Example 1.

The lithium ion batteries manufactured in Example 3 and Comparative Example 1 were discharged at 3 C and the obtained discharge curves are illustrated in FIG. 1. In the drawing, the upper curve A is the discharge curve of the lithium ion battery manufactured in Example 3 and the lower curve B is the discharge curve of the lithium ion battery manufactured in Comparative Example 1.

As is clear from the discharge curves in FIG. 1, it is found that, in the lithium ion battery produced using the electrode material of Example 3, the discharge voltage does not easily decrease and the discharge capacity is also greater compared with those of the lithium ion battery produced using the electrode material of Comparative Example 1. This is considered to be because the electrode material of Example 3 has excellent ion conductivity.

wherein the metal oxide is made of at least one selected from a group consisting of Al$_2$O$_3$, ZrO$_2$, SiO$_2$, and TiO$_2$,
wherein the electrode active material particles are represented by Li$_x$A$_y$D$_z$PO$_4$ (here, A represents one or more selected from the group consisting of Co, Mn, Ni, Fe, Cu, and Cr, D represents one or more selected from the group consisting of Mg, Ca, Sr, Ba, Ti, Zn, B, Al, Ga, In, Si, Ge, Sc, Y, and rare earth elements, 0<x<1.2, 0<y≤1, 0≤z<1.5, and 0.9<y≤1),
wherein the carbonaceous film layer is a single layer in which the metal oxide is uniformly disposed in carbon.

2. The electrode material according to claim 1,
wherein an amount of carbon is in a range of 0.6 parts by mass to 4.0 parts by mass with respect to 100 parts by mass of the electrode active material particles.

3. The electrode material according to claim 1,
wherein an amount of carbon is in a range of 0.9 parts by mass to 1.2 parts by mass with respect to 100 parts by mass of the electrode active material particles.

4. A method for manufacturing an electrode material comprising electrode active material particles and a carbonaceous film layer which coats surfaces of the electrode active material particles, wherein electrode active material particles, a metal salt or metal alkoxide containing any one or more metal atoms selected from a group consisting of Al, Zr, Si, and Ti, and an organic compound which is a precursor of carbon are mixed so that a total blending amount of the metal salt or metal alkoxide satisfies that an amount of a metal oxide included in the carbonaceous film layer when the metal salt or metal alkoxide is all changed to the metal oxide falls in a range of 5% by mass to 70% by mass, and are heated in a non-oxidative atmosphere, wherein the metal oxide is made of at least one selected from a group consisting of $Al_2O_3$, $ZrO_2$, $SiO_2$, and $TiO_2$, wherein the electrode active material particles are represented by $Li_xA_yD_zPO_4$ (here, A represents one or more selected from the group consisting of Co, Mn, Ni, Fe, Cu, and Cr, D represents one or more selected from the group consisting of Mg, Ca, Sr, Ba, Ti, Zn, B, Al, Ga, In, Si, Ge, Sc, Y, and rare earth elements, $0<x<1.2$, $0<y\leq1$, $0\leq z<1.5$, and $0.9<y+z\leq1$).

5. The method for manufacturing an electrode material according to claim 4, wherein the total blending amount of the organic compound is in a range of 0.6 parts by mass to 4.0 parts by mass with respect to 100 parts by mass of the electrode active material particles when the total blending amount is converted to an amount of carbon.

* * * * *